United States Patent
Dobashi et al.

(10) Patent No.: US 12,038,751 B2
(45) Date of Patent: Jul. 16, 2024

(54) WORKING MACHINE, WORKING MACHINE CONTROL METHOD, AND STORAGE MEDIUM

(71) Applicant: HONDA MOTOR CO., LTD., Tokyo (JP)

(72) Inventors: Manabu Dobashi, Wako (JP); Makoto Yamamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 408 days.

(21) Appl. No.: 17/377,354

(22) Filed: Jul. 15, 2021

(65) Prior Publication Data
US 2021/0341931 A1 Nov. 4, 2021

Related U.S. Application Data

(63) Continuation of application No. PCT/JP2019/004407, filed on Feb. 7, 2019.

(51) Int. Cl.
*G05D 1/00* (2024.01)
*G05D 1/02* (2020.01)
(Continued)

(52) U.S. Cl.
CPC ......... *G05D 1/0214* (2013.01); *G05D 1/0223* (2013.01); *A01D 34/008* (2013.01); *A01D 34/74* (2013.01); *A01D 2101/00* (2013.01)

(58) Field of Classification Search
CPC ............... G05D 1/0214; G05D 1/0223; G05D 2201/0208; G05D 1/00; A01D 34/008;
(Continued)

(56) References Cited

U.S. PATENT DOCUMENTS 7,813,852 B2   10/2010  Kato et al.
8,800,101 B2   8/2014   Kim et al.
(Continued)

FOREIGN PATENT DOCUMENTS

EP    2869690 B1    11/2017
JP    H04-047412 A   2/1992
(Continued)

OTHER PUBLICATIONS

International Search Report and Written Opinion for PCT/JP2019/004407 mailed Apr. 16, 2019.
(Continued)

*Primary Examiner* — Yonel Beaulieu
(74) *Attorney, Agent, or Firm* — Thomas| Horstemeyer, LLP

(57) ABSTRACT

A working machine comprising: a control unit configured to cause the working machine to perform work in a first work mode in which work is performed without collecting diagnostic data; an acceptance unit configured to accept a diagnosis instruction; and a switching unit configured to switch from the first work mode to a second work mode in which work is performed while collecting the diagnostic data, in a case where the diagnosis instruction is accepted by the acceptance unit, wherein the control unit causes the working machine to perform work in the second work mode in a case where the switching unit switches to the second work mode.

18 Claims, 6 Drawing Sheets

(51) Int. Cl.
  *A01D 34/00*  (2006.01)
  *A01D 34/74*  (2006.01)
  *A01D 101/00* (2006.01)

(58) Field of Classification Search
  CPC .... A01D 34/74; A01D 2101/00; A01D 34/64;
                    A01D 34/00; G05B 23/0237
  See application file for complete search history.

(56) References Cited

U.S. PATENT DOCUMENTS

| | | | |
|---|---|---|---|
| 9,622,399 | B2 | 4/2017 | Kremmer et al. |
| 9,928,459 | B2 | 3/2018 | Kim et al. |
| 10,311,739 | B2 | 6/2019 | Guan et al. |
| 10,777,027 | B2 | 9/2020 | Oda et al. |
| 10,973,168 | B2 | 4/2021 | Hans et al. |
| 2008/0021607 | A1 | 1/2008 | Kato et al. |
| 2013/0025085 | A1 | 1/2013 | Kim et al. |
| 2013/0030750 | A1 | 1/2013 | Kim et al. |
| 2015/0366124 | A1 | 12/2015 | Kremmer et al. |
| 2016/0372138 | A1* | 12/2016 | Shinkai ............... G10L 25/66 |
| 2018/0225895 | A1 | 8/2018 | Oda et al. |
| 2018/0268719 | A1 | 9/2018 | Guan et al. |
| 2018/0352731 | A1 | 12/2018 | Hans et al. |
| 2019/0339161 | A1 | 11/2019 | Taguchi et al. |

FOREIGN PATENT DOCUMENTS

| | | |
|---|---|---|
| JP | H09128044 A | 5/1997 |
| JP | 2005-304515 A | 11/2005 |
| JP | 2010-065645 A | 3/2010 |
| JP | 2018503194 A | 2/2018 |
| JP | 2018105782 A | 7/2018 |
| JP | 2018169826 A | 11/2018 |
| JP | 2018-201347 A | 12/2018 |
| KR | 10-2013-0012516 A | 2/2013 |
| KR | 10-2013-0012517 A | 2/2013 |
| KR | 10-2013-0012518 A | 2/2013 |
| KR | 10-2013-0012519 A | 2/2013 |
| WO | 2018/011999 A1 | 1/2018 |
| WO | 2020161856 A1 | 8/2020 |

OTHER PUBLICATIONS

Japanese Office Action for Japanese Patent Application No. 2020-570288 mailed Mar. 10, 2023 (partially translated).
Japanese Office Action for Japanese Patent Application No. 2020-570288 mailed Oct. 7, 2022 (partially translated).
Extended European Search Report for European Patent Application No. 19914498.1 mailed Dec. 7, 2021.

\* cited by examiner

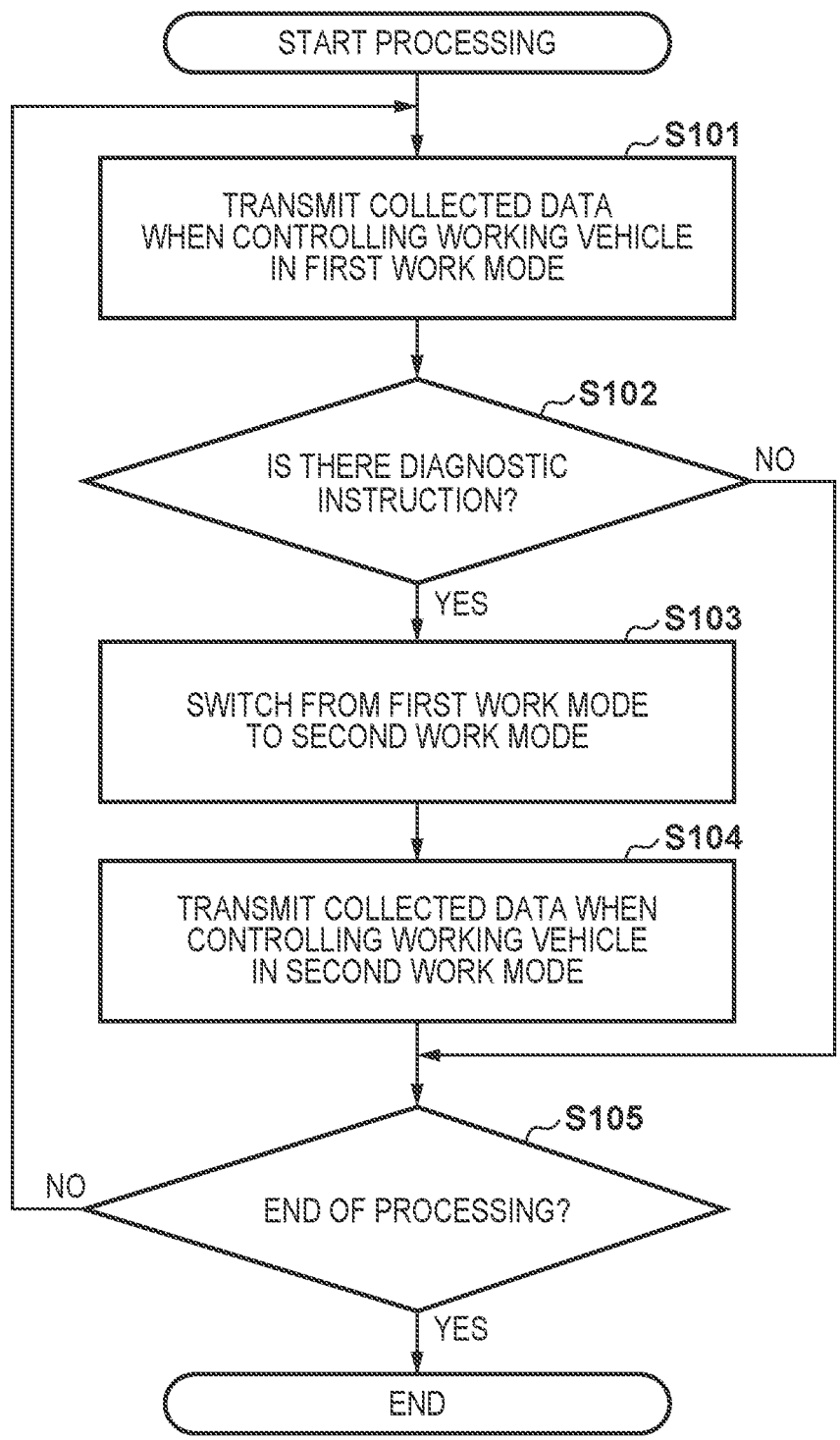

FIG. 6A

| | COLLECTED DATA AT NORMAL TIMES |
|---|---|
| 1 | RATE OF SKIDDING |
| 2 | TOTAL NUMBER OF COLLISIONS |
| 3 | BLADE LOAD |
| 4 | WORK COMPLETION RATE |

FIG. 6B

| | COLLECTED DATA (DATA FOR DIAGNOSIS) AT TIME OF DIAGNOSIS |
|---|---|
| 1 | NUMBER OF SKIDS AT EACH POINT |
| 2 | NUMBER OF COLLISIONS AT EACH POINT |
| 3 | NUMBER OF TIMES OF WORK AT EACH POINT |

WORKING MACHINE, WORKING MACHINE CONTROL METHOD, AND STORAGE MEDIUM

CROSS-REFERENCE TO RELATED APPLICATION(S)

This application is a continuation of International Patent Application No. PCT/JP2019/004407 filed on Feb. 7, 2019, the entire disclosures of which is incorporated herein by reference.

BACKGROUND OF THE INVENTION

Field of the Invention

The present invention relates to a working machine, a working machine control method, and a storage medium.

Description of the Related Art

PTL 1 discloses a moving working machine that autonomously travels according to sensor information of various sensors such as an obstacle recognition sensor and the like.

When there is a problem with such a working machine (for example, a lawn mower or the like) or the efficiency of mowing the lawn decreases, a dealership or the like rushes to a place where the working machine is located to diagnose the state of the working machine.

CITATION LIST

Patent Literature

PTL 1: Japanese Patent Laid-Open No. 9-128044

However, it takes labor, time, and cost to diagnose the state of the working machine, and it is required to interrupt the work during the diagnosis. Therefore, there is a problem that the work scheduled by the user cannot be performed.

The present invention has been made in view of the problems described above, and the present invention provides a technique for collecting data for diagnosing a working machine while continuing work.

SUMMARY OF THE INVENTION

According to one aspect of the present invention, there is provided a working machine comprising: a control unit configured to cause the working machine to perform work in a first work mode in which work is performed without collecting diagnostic data; an acceptance unit configured to accept a diagnosis instruction; and a switching unit configured to switch from the first work mode to a second work mode in which work is performed while collecting the diagnostic data in a case where the diagnosis instruction is accepted by the acceptance unit, the control unit causes the working machine to perform work in the second work mode in a case where the switching unit switches to the second work mode.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 4 is a flowchart illustrating a procedure of processing performed by the working vehicle according to an embodiment.

FIG. 6A is a diagram illustrating an example of collected data at normal times according to an embodiment.

FIG. 6B is a diagram illustrating an example of collected data at a time of diagnosis according to an embodiment.

DESCRIPTION OF THE EMBODIMENTS

Figure 1:
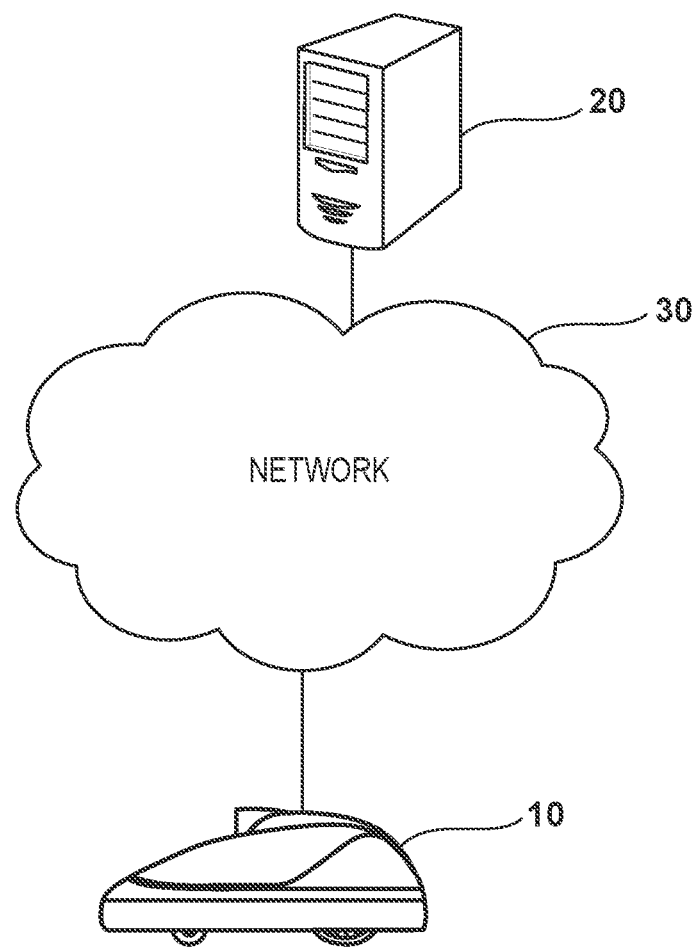
FIG. 1 is a diagram illustrating a configuration example of a management system according to an embodiment.

Hereinafter, an embodiment of the present invention will be described with reference to the accompanying drawings. Note that the same components are denoted by the same reference numerals throughout the drawings.

<System Configuration>

FIG. 1 is a diagram illustrating a configuration example of a management system according to an embodiment of the present invention. The management system includes a working vehicle 10 and a management device 20. The working vehicle 10 and the management device 20 are configured to be communicable via a network 30. The working vehicle 10 is, for example, a working machine (a lawn mower, a grass mower, a snow plow, a golf ball collecting machine, and the like) that autonomously travels and performs predetermined work in a work area. The management device 20 is a server device and processes various pieces of information collected from the working vehicle 10. Note that, in the present embodiment, a lawn mower will be described as an example of the working vehicle 10, but the present invention can also be applied to other types of working machines.

<Configuration of Working Vehicle >

Figure 2A:
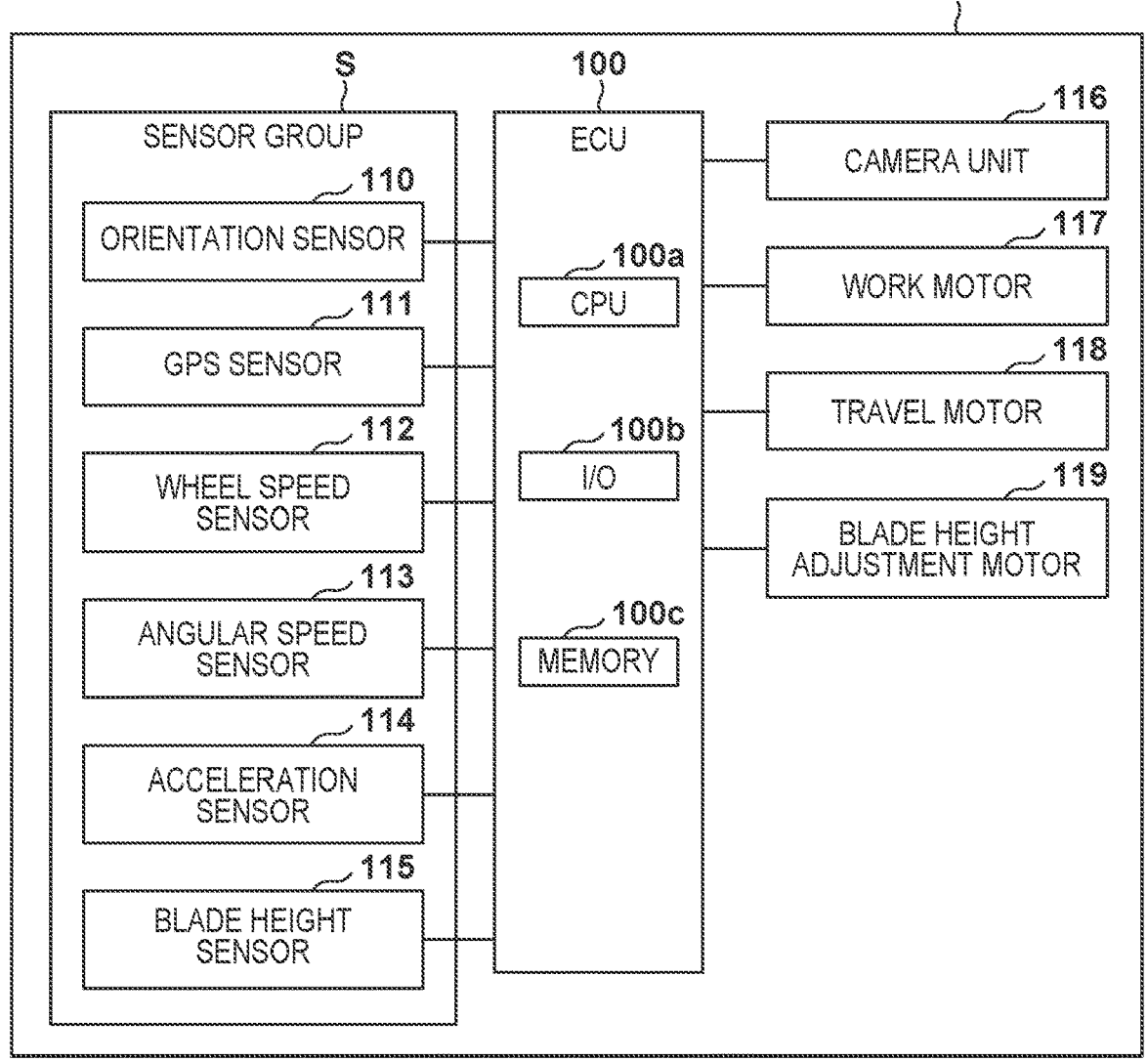
FIG. 2A is a diagram illustrating a hardware configuration example of the working vehicle according to an embodiment.

FIG. 2A is a diagram illustrating a hardware configuration example of the working vehicle according to an embodiment of the present invention. An ECU 100 is an electronic control unit including a microcomputer formed on a circuit board and controls the operation of the working vehicle 10. The ECU 100 includes a CPU 100a, an I/O 100b, and a memory 100c. The I/O 100b inputs and outputs various types of information. The memory 100c is a read-only memory (ROM), an electrically erasable programmable read-only memory (EEPROM), a random access memory (RAM), or the like. The memory 100c stores a work schedule of the working vehicle 10, information on a work area, work mode information, various programs for controlling the operation of the working vehicle 10, and the like. The ECU 100 can operate as each processing unit for realizing the present invention by reading and executing the program stored in the memory 100c.

The ECU 100 is connected to a sensor group S with various sensors. The sensor group S includes an orientation sensor 110, a GPS sensor 111, a wheel speed sensor 112, an angular speed sensor 113, an acceleration sensor 114, and a blade height sensor 115.

The orientation sensor 110 and the GPS sensor 111 are sensors for acquiring information on the position and orientation of the working vehicle 10. The orientation sensor 110 detects an orientation according to geomagnetism. The GPS sensor 111 receives a radio wave from a GPS satellite and detects information indicating a current position (latitude and longitude) of the working vehicle 10.

The wheel speed sensor 112, the angular speed sensor 113, and the acceleration sensor 114 are sensors for acquiring information regarding a moving state of the working vehicle 10. The wheel speed sensor 112 detects wheel speeds of the left and right rear wheels. The angular speed sensor 113 detects an angular speed around an axis in the up-and-down direction (z-axis in the vertical direction) of the gravity center position of the working vehicle 10. The acceleration sensor 114 detects acceleration in three orthogonal axial directions acting on the working vehicle 10.

The blade height sensor 115 detects a height of a rotary blade for mowing work with respect to the ground contact surface of the working vehicle 10. The detection result of the blade height sensor 115 is output to the ECU 100. A blade height adjustment motor 119 is driven based on the control of the ECU 100, and the blade moves up and down in the up-and-down direction to adjust the height from the ground contact surface.

Outputs of the various sensor group S are input to the ECU 100 via the I/O 100*b*. The ECU 100 controls a work motor 117, a travel motor 118, and the height adjustment motor 119 based on the outputs of the various sensor group S. The ECU 100 controls the rotation of the blade by outputting a control value via the I/O 100*b* and controlling the work motor 117. In addition, the traveling of the working vehicle 10 is controlled by outputting a control value via the I/O 100*b* and controlling the travel motor 118. In addition, the height of the blade is adjusted by outputting a control value via the I/O 100*b* to control the blade height adjustment motor 119. Here, the I/O 100*b* can function as a communication interface and can be connected to the management device 20 or another device (for example, a communication device (smartphone) held by the user of the working vehicle 10) in a wired or wireless manner via the network 30.

In addition, the working vehicle 10 includes a camera unit 116 including a plurality of cameras and calculates and acquires distance information between an object existing forward and the working vehicle 10 using images captured by the plurality of cameras having parallax. Then, the operation of the working vehicle 10 is controlled based on the captured image and the object recognition model held in advance.

The work motor 117 is an electric motor positioned above the rotary blade for mowing operation. The blade is connected to the work motor 117 and is rotationally driven by the work motor 117. The travel motor 118 is two electric motors (prime movers) attached to the working vehicle 10. The two electric motors are connected to the left and right rear wheels, respectively. By independently rotating the left and right wheels forward (rotating in the forward direction) or backward (rotating in the backward direction) with the front wheel as a driven wheel and the rear wheel as a drive wheel, the working vehicle 10 can be moved in various directions. The blade height adjustment motor 119 is a motor for adjusting the height of the blade in the up-and-down direction with respect to the ground contact surface.

Figure 2B:
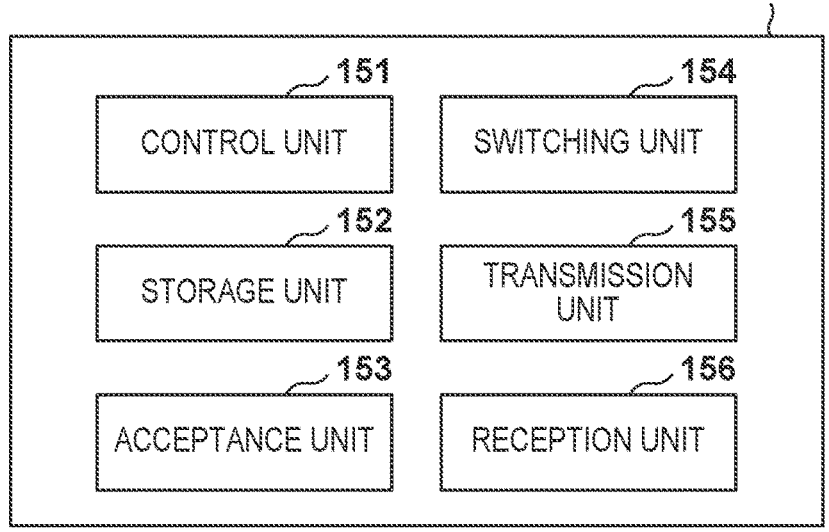
FIG. 2B is a diagram illustrating a functional configuration example of the working vehicle according to an embodiment.

Next, FIG. 2B is a diagram illustrating a functional configuration example of the working vehicle according to an embodiment of the present invention. The working vehicle 10 includes a control unit 151, a storage unit 152, an acceptance unit 153, a switching unit 154, a transmission unit 155, and a reception unit 156.

The control unit 151 corresponds to the CPU 100*a* and controls the operation of the working vehicle 10. At normal times, the control unit 151 causes the working vehicle 10 to perform work in a first work mode in which work is performed without collecting diagnostic data. On the other hand, at the time of diagnosis, the working vehicle 10 is caused to perform work in a second work mode in which work is performed while collecting diagnostic data. The storage unit 152 corresponds to the memory 100*c* and stores various information.

The acceptance unit 153 accepts a diagnosis instruction. Here, the diagnosis instruction is an instruction for starting collection of diagnostic data. The diagnosis instruction may be accepted by a user operation, or the diagnosis instruction may be accepted from the control unit 151 when the control unit 151 determines that there is a possibility of failure in the working vehicle 10. The determination of the possibility of failure can be made based on data collected in the first work mode at normal times.

The switching unit 154 switches the work mode of the working vehicle 10 from the first work mode in which work is performed without collecting diagnostic data to the second work mode in which work is performed while collecting diagnostic data. The transmission unit 155 transmits data collected by the working vehicle 10 to the management device 20. Further, the transmission unit 155 also functions as a notification unit that performs various notifications to the user. For example, notification can be performed to a communication device (not illustrated in the drawings) (for example, a smartphone) held by the user. Alternatively, it may be configured that the working vehicle 10 may notify a user around the working vehicle 10 by a voice from a speaker (not illustrated in the drawings) or display on a display unit (not illustrated in the drawings). The reception unit 156 receives an instruction transmitted from management device 20.

Here, an example of the collected data at normal times will be described with reference to FIG. 6A. The collected data at normal times is data collected while the working vehicle 10 performs normal work, and is, for example, a rate of skidding, the total number of collisions, a blade load, a work completion rate, and the like.

The rate of skidding is a rate at which wheels of the working vehicle 10 skid. For example, it can be calculated by dividing the number of skidding by travel time. The total number of collisions is obtained by counting the number of collisions when the working vehicle 10 collides with an obstacle or the like in the work area while the working vehicle 10 performs work. The blade load is, for example, a load applied to the blade by grass or lawn coming into contact with the blade. The blade load can be determined, for example, by calculating how much the actual number of rotations of the blade with respect to the predetermined output by the work motor 117 is reduced with respect to the ideal value in a case where no load is applied.

The work completion rate is a rate indicating how much the work is completed. For example, by plotting the travel history of the working vehicle 10 by the GPS sensor 111, so that the work completion rate can be acquired by calculating the ratio of the area where the working vehicle 10 has traveled to the area of the work area.

Note that the collected data at normal times is not limited to the illustrated example. Other data may be further included. For example, at normal times, data of ambient temperature and humidity may be further collected. Alternatively, a part of the data as illustrated in FIG. 6A may not be collected.

Next, an example of diagnostic data will be described with reference to FIG. 6B. The diagnostic data is data collected to diagnose the state of the working vehicle 10. By controlling the operation of the working vehicle 10 based on the collected diagnostic data, more appropriate control according to the situation can be performed.

The diagnostic data includes, for example, the number of skidding at each point in the work area indicating the number of skidding of the wheel included in the working vehicle 10, the number of collisions of the working vehicle 10 at each point in the work area, and the number of times of work at each point in the work area. Here, for example, when the work area is divided by a grid and considered as an aggregate of rectangular small regions (grid regions), the point is one small region.

The number of skidding at each point is data obtained by performing counting when skidding occurs while the working vehicle 10 is traveling at each point and aggregating the counts at each point constituting the work area. As a result, it is possible to recognize at which point skidding is likely to occur.

The number of collisions at each point is data obtained by performing counting when the working vehicle 10 collides with an obstacle or the like while traveling at each point and aggregating the counts at each point constituting the work area. As a result, it is possible to recognize at which point the collision is likely to occur.

The number of times of work at each point is data obtained by performing counting when the working vehicle 10 travels through each point while performing work and aggregating the counts at each point constituting the work area. As a result, it is possible to recognize at which point work is not yet performed.

<Configuration of Management Device>

Figure 3A:
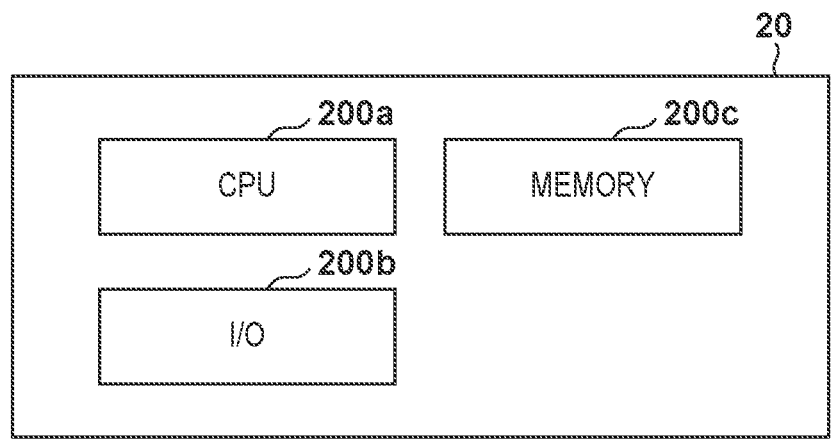
FIG. 3A is a diagram illustrating a hardware configuration example of a management device according to an embodiment.

FIG. 3A is a diagram illustrating a hardware configuration example of a management device according to an embodiment of the present invention. The management device 20 is, for example, a server device, and includes a CPU 200a, an I/O 200b, and a memory 200c.

The CPU 200a controls the operation of the management device 20. The I/O 200b inputs and outputs various types of information. The memory 200c is a read-only memory (ROM), an electrically erasable programmable read-only memory (EEPROM), a random access memory (RAM), or the like. The memory 200c stores work mode information of the working vehicle 10, various programs for controlling the operation of the management device 20, and the like. The CPU 200a can operate as each processing unit for realizing the present invention by reading and executing the program stored in the memory 200c.

Figure 3B:
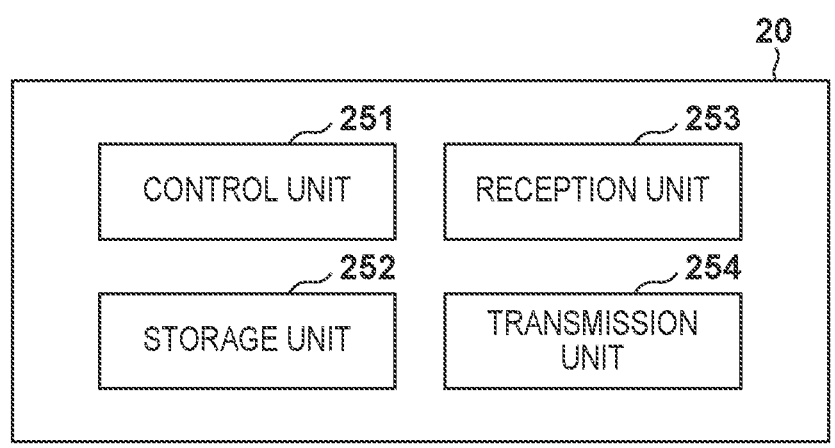
FIG. 3B is a diagram illustrating a functional configuration example of the management device according to an embodiment.

Next, FIG. 3B is a diagram illustrating a functional configuration example of the management device according to an embodiment of the present invention. The management device 20 includes a control unit 251, a storage unit 252, a reception unit 253, and a transmission unit 254.

The control unit 251 corresponds to the CPU 200a, can control the operation of the management device 20, and can also control the operation of the working vehicle 10 by transmitting a change instruction of the work mode for operating the working vehicle 10 to the working vehicle 10.

The storage unit 252 corresponds to the memory 200c and stores various information. For example, collected data at normal times transmitted from the working vehicle 10 and collected data at the time of diagnosis (diagnostic data) are stored. The reception unit 253 receives data transmitted from the working vehicle 10. The transmission unit 254 transmits an instruction corresponding to the analysis content analyzed based on the data received from the working vehicle 10 to the working vehicle 10.

<Processing of Working Vehicle>

Next, a procedure of processing performed by the working vehicle 10 according to the present embodiment will be described with reference to a flowchart of FIG. 4.

In S101, the control unit 151 causes the working vehicle 10 to perform work in the first work mode in which work is performed without collecting diagnostic data. Note that, during this operation, diagnostic data is not collected, but collection of collected data at normal times as illustrated in FIG. 6A is performed. The storage unit 152 stores the collected data, and the transmission unit 155 transmits the collected data at normal times being collected to the management device 20.

In S102, the acceptance unit 153 determines whether or not a diagnosis instruction has been accepted. The diagnosis instruction is an instruction for starting collection of diagnostic data. The diagnosis instruction may be accepted by a user operation. Alternatively, when the control unit 151 determines that there is a possibility of failure in the working vehicle 10, a diagnosis instruction may be automatically accepted from the control unit 151. The determination of the possibility of failure can be made based on data collected in the first work mode at normal times. For example, when the magnitude of the blade load is equal to or greater than the threshold value, the control unit 151 may determine that there is a possibility of failure, and a diagnosis instruction may be accepted from the control unit 151 to the acceptance unit 153. Alternatively, a diagnosis instruction may be automatically accepted from the control unit 151 at predetermined time intervals. When the diagnosis instruction is accepted, the processing proceeds to S103. On the other hand, when the diagnosis instruction is not accepted, the processing proceeds to S105.

In S103, the switching unit 154 switches the work mode of the working vehicle 10 from the first work mode in which work is performed without collecting diagnostic data to the second work mode in which work is performed while collecting diagnostic data.

In S104, the control unit 151 causes the working vehicle 10 to perform work in the second work mode in which work is performed while collecting diagnostic data. In the second work mode, the working vehicle 10 is controlled to further collect diagnostic data in addition to the collected data at normal times. Alternatively, in the second work mode, the working vehicle 10 may be controlled to perform collection reducing at least some types of data of the collected data at normal times and further collect the diagnostic data. As a result, the processing load of the control unit 151 can be reduced. The storage unit 152 stores the collected data, and the transmission unit 155 transmits the data to the management device 20.

In S105, the control unit 151 determines whether or not to end the processing. Examples of the case where the processing is ended include a case where an end time according to a scheduled work schedule arrives, a case where a power-off button (not illustrated in the drawings) provided in the working vehicle 10 is pressed by the user, and the like. When ending the processing, a series of processing in FIG. 4 is ended. On the other hand, when the processing is not ended, the processing returns to S101 and is repeated.

Note that, after the collection of the diagnostic data, the control unit 151 may analyze the collected diagnostic data and control the operation of the working vehicle 10 based on the analysis result. Alternatively, the management device 20 may analyze the diagnostic data received from the working vehicle 10 and transmit an instruction to control the operation of the working vehicle 10 to the working vehicle 10 based on the analysis result. The working vehicle 10 may control the operation in accordance with the instruction received from the management device 20. As a result, the processing load of the working vehicle 10 can be reduced.

For example, it may be analyzed at which point skidding is likely to occur based on the number of skidding for each point as diagnostic data, and the operation of the working vehicle 10 may be controlled so that the traveling speed of the working vehicle 10 becomes slower around a point where the number of skidding is equal to or greater than a threshold.

In addition, it may be analyzed at which point a collision is likely to occur based on the number of collisions for each point as diagnostic data, and the operation of the working vehicle 10 may be controlled so that the traveling speed of the working vehicle 10 becomes slower around a point where the number of collisions is equal to or greater than a threshold.

In addition, it may be analyzed at which point work has not been performed yet based on the number of times of work for each point as diagnostic data, and the operation of the working vehicle 10 may be controlled so as to sequentially travel through a plurality of points with a fewer number of times of work. For example, five points with a fewer number of times of work may be extracted, and the operation of the working vehicle 10 may be controlled so as to travel those five points in ascending order of the number of times of work. In addition, any of a plurality of points with a fewer number of times of work may be set as a start point of work by the working vehicle 10. For example, five points with a fewer number of times of work may be extracted, and any one of the five points may be set as a start point of work by the working vehicle 10. As a result, it is possible to preferentially perform work at a spot where there is much unperformed work, for example, in the case of a lawn mower or a grass mower, at a spot where there is much uncut lawn or grass, and the overall work efficiency can be improved.

As described above, the working vehicle 10 according to the present embodiment performs work in the second work mode in which work is performed while collecting diagnostic data according to the diagnosis instruction. Therefore, it is possible to perform diagnosis while performing working. In addition, the operation of the working vehicle 10 can be appropriately controlled based on the diagnostic data.

Note that, in S104, the control unit 151, in the second work mode, may control the working vehicle 10 to stop a part of the functions of the working vehicle 10 and collect the collected data at normal times and the diagnostic data. For example, a communication function of communicating with a communication device (for example, a smartphone) held by the user may be temporarily stopped. The processing load of the control unit 151 can be reduced by stopping a part of the functions. Therefore, the heat generation of the CPU can be reduced, and the battery life can be extended.

In addition, in order to reduce the processing load of the control unit 151, the data collection frequency may be changed according to the work mode. For example, it may be configured that, in the first work mode, the collected data at normal times may be collected at a first frequency, and in the second work mode, the collected data at normal times may be collected at a second frequency lower than the first frequency, and the diagnostic data is further collected. For example, the collected data at normal times may be collected every one minute at normal times, and the collected data at normal times may be collected every 30 minutes or every one hour at the time of diagnosis.

In addition, it may be configured that the control unit 151 switches from the second work mode to the first work mode in a case where a predetermined amount or more of diagnostic data is collected or in a case where a predetermined time has elapsed since starting collection of diagnostic data. As a result, it is possible to automatically return to the original work mode when diagnosis becomes unrequired, and it is possible to reduce a monitoring burden on the user.

<Processing of Management Device>

Figure 5:
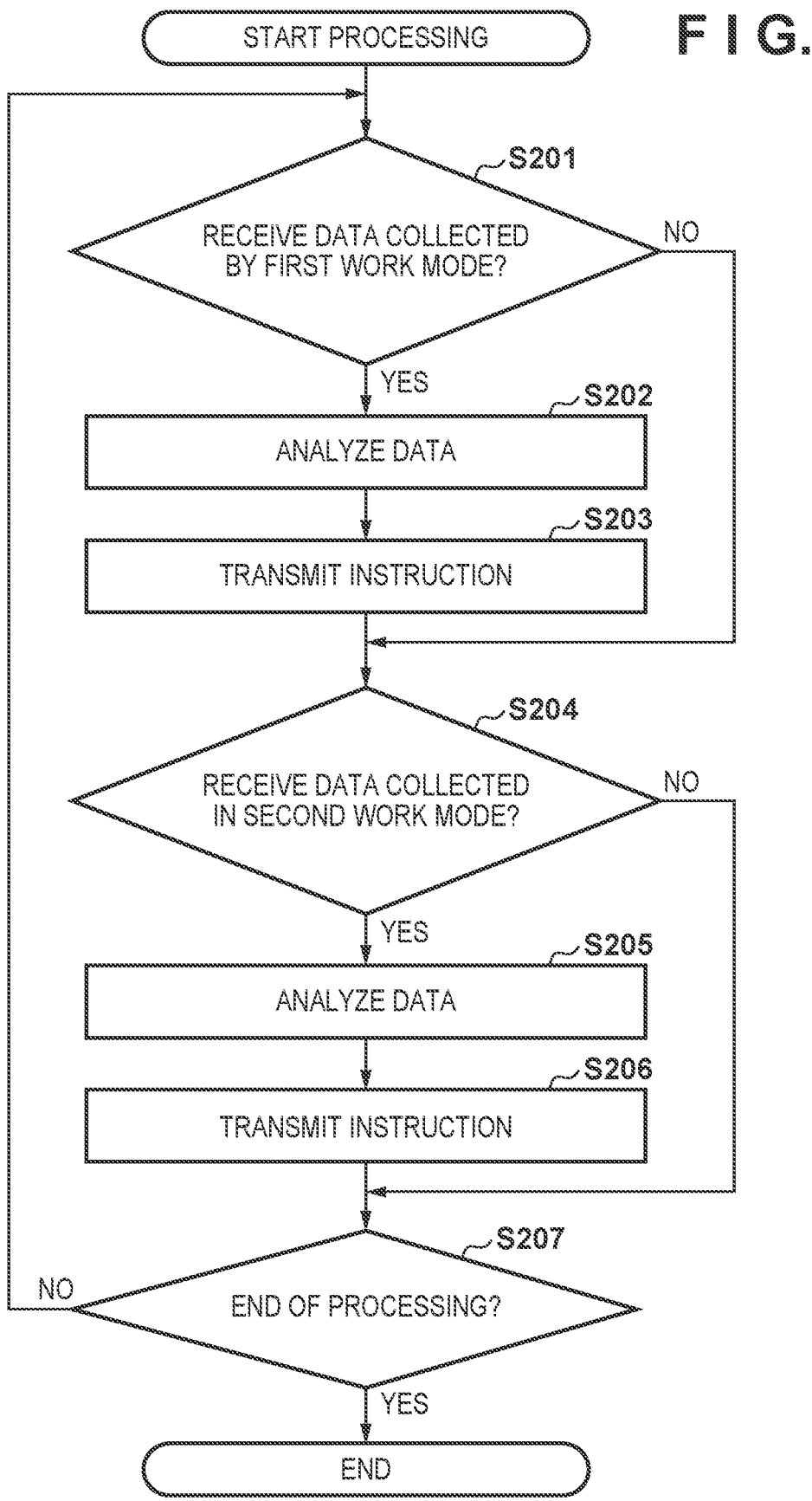
FIG. 5 is a flowchart illustrating a procedure of processing performed by the management device according to an embodiment.

Next, a procedure of processing performed by the management device 20 according to the present embodiment will be described with reference to a flowchart of FIG. 5.

In S201, the reception unit 253 determines whether or not the collected data at normal times of the working vehicle 10, that is, the data collected in the first work mode, transmitted from the working vehicle 10 has been received. When the collected data at normal times is received, the processing proceeds to S202. On the other hand, when the collected data at normal times is not received, the processing proceeds to S204.

In S202, the control unit 251 performs analysis based on the collected data at normal times collected in S201 and accumulated in the storage unit 252. For example, it may be determined that there is a possibility that a failure occurs in the working vehicle 10 when the blade load, which is the collected data at normal times, is equal to or greater than a threshold. Then, an instruction based on the analyzed result is generated. For example, when there is a possibility that a failure occurs in the working vehicle 10, a diagnosis instruction is generated.

In S203, the transmission unit 254 transmits the instruction generated in S202 to the working vehicle 10. In response to the diagnosis instruction, the working vehicle 10 switches the work mode to the second work mode in which work is performed while collecting diagnostic data. Note that, when only accumulating the analysis result and not generating the instruction, this step may be skipped.

In S204, the reception unit 253 determines whether or not the diagnostic data which is the collected data at the time of diagnosis of the working vehicle 10, that is, the data collected in the second work mode, transmitted from the working vehicle 10 has been received. When the diagnostic data is received, the process proceeds to S205. On the other hand, when the diagnostic data is not received, the process proceeds to S207.

In S205, the control unit 251 performs analysis based on the diagnostic data collected in S204 and accumulated in the storage unit 252 and generates an instruction to be transmitted to the working vehicle 10. For example, it may be analyzed at which point skidding is likely to occur on the basis of the number of skidding for each point which is diagnostic data, and an instruction to control the operation of the working vehicle 10 so that the traveling speed of the working vehicle 10 becomes slower may be generated around a point where the number of skidding is equal to or greater than a threshold.

In addition, it may be analyzed at which point a collision is likely to occur on the basis of the number of collisions for each point which is diagnostic data, and an instruction to control the operation of the working vehicle 10 so that the traveling speed of the working vehicle 10 becomes slower may be generated around a point where the number of collisions is equal to or greater than a threshold.

In addition, it may be analyzed at which point work has not been performed yet based on the number of times of work for each point as diagnostic data and generate an instruction to control the operation of the working vehicle 10 so as to sequentially travel through a plurality of points with a fewer number of times of work. In addition, it is possible to generate an instruction to set any of a plurality of points with a fewer number of times of work as a start point of work by the working vehicle 10. Alternatively, an instruction in which at least some of these are combined may be generated.

In S206, the transmission unit 254 transmits the instruction generated in S205 to the working vehicle 10. The working vehicle 10 controls the operation of the working vehicle 10 based on the instruction.

In S207, the control unit 251 determines whether or not to end the processing. The case where the processing is ended is, for example, a case where the end time according to the work schedule scheduled by the working vehicle 10 arrives. When ending the processing, a series of processing in FIG. 5 is ended. On the other hand, when the processing is not ended, the processing returns to S201 and is repeated.

As described above, the management device 20 according to the present embodiment receives various kinds of collected data (collected data at normal times or diagnostic data) collected by the working vehicle 10 and transmits an instruction for controlling the operation of the working vehicle 10 to the working vehicle 10 based on the analysis result. As a result, it is possible to appropriately control the operation of the working vehicle 10 based on the collected data at normal times or the diagnostic data.

[Modifications]

In the embodiment described above, the number of skidding at each point, the number of collisions of the working vehicle 10 at each point, and the number of times of work at each point in the work area have been described as examples of the diagnostic data. However, the diagnostic data is not limited to these examples. For example, "the number of times of obstacle avoidance at each point" may be counted and stored as the diagnostic data. The number of times of obstacle avoidance is the number of times that, by detecting an obstacle by a sensor (for example, a camera, a radar, or the like) provided in the working vehicle 10, collision with the detected obstacle can be avoided.

The following can be estimated by counting and storing the number of collisions and the number of times of obstacle avoidance of the working vehicle 10 for each point. For example, in a case where the number of collisions is large and the number of times of obstacle avoidance is small at a certain point, it can be estimated that it is a point where it is difficult to detect an obstacle topographically. For example, this is a case where an obstacle such as a rock and the like exists in a blind spot in the traveling direction of the working vehicle 10. In such a case, the obstacle may be out of the field of view of the camera or the scanning range of the radar. Alternatively, when passing between two obstacles, the radar does not detect the obstacle in the passing direction of the working vehicle 10, but the distance between the obstacles is narrow for the working vehicle 10 to pass through, and a collision may occur.

In a case where the number of collisions is large and the number of times of obstacle avoidance is small, this may be notified to the user. Specifically, the user may be notified when the number of collisions is equal to or greater than a threshold and the number of times of obstacle avoidance is equal to or smaller than another threshold at a certain point. This makes it possible to suppress the occurrence of collision by removing obstacles such as rocks and the like or blocking narrow paths.

Note that, in a case where the number of collisions is small and the number of times of obstacle avoidance is large at a certain point, it can be estimated that it is a point where an obstacle can be detected without any problem. In addition, in a case where the number of collisions is small and the number of obstacle collisions is also small at a certain point, it can be estimated that there is no obstacle at the certain point, or even if there is an obstacle at the certain point, the obstacle is negligible. Therefore, for example, when the number of collisions is equal to or smaller than a threshold and the number of obstacle collisions is equal to or smaller than another threshold, the control unit 251 may generate an instruction to control the operation of the working vehicle 10 so that the traveling speed of the working vehicle 10 becomes faster. As a result, it is possible to perform adaptive control further estimating the situation of the obstacle.

In addition, in the embodiment described above, the lawn mower has been described as an example of the autonomous working machine, but the autonomous working machine is not limited to the lawn mower. For example, the present invention can also be applied to other types of autonomous working machines such as an autonomous snow removing machine, a golf ball collector, and the like. Further, in each embodiment described above, the example in which the working machine is autonomously controlled based on the images acquired from the plurality of cameras has been described, but the working machine to which the present invention can be applied is not limited to the case of using the camera image. For example, the present invention can also be applied to a working machine that performs autonomous control using an obstacle sensor (distance measurement sensor) such as an ultrasonic sensor, an infrared sensor, or the like.

The present invention is not limited to the above embodiments and various changes and modifications can be made within the spirit and scope of the present invention. Therefore, to apprise the public of the scope of the present invention, the following claims are made.

Summary of Embodiments

1. The working machine (for example, 10) of the above embodiment is:

a working machine including:

a control unit (for example, 151) configured to cause the working machine to perform work in a first work mode in which work is performed without collecting diagnostic data;

an acceptance unit (for example, 153) configured to accept a diagnosis instruction; and a switching unit (for example, 154) configured to switch from the first work mode to a second work mode in which work is performed while collecting the diagnostic data in a case where the diagnosis instruction is accepted by the acceptance unit, in which the control unit causes the working machine to perform work in the second work mode in a case where the switching unit switches to the second work mode.

According to this embodiment, it is possible to collect data for diagnosing the working machine while continuing the work. Therefore, it is possible to diagnose the state of the working machine without interrupting the work. In addition, according to this embodiment, since the work mode is switched only in a case where required and the diagnostic data is collected, it is possible to reduce the load at normal times as compared with the case where the diagnostic data is constantly collected.

2. In the working machine (for example, 10) of the above embodiment, the control unit controls the working machine to collect predetermined data in the first work mode and further collect the diagnostic data in addition to the predetermined data in the second work mode.

According to this embodiment, it is possible to collect the predetermined data in any work mode, and it is possible to continuously collect data that needs to be collected during operation of the working machine.

3. In the working machine (for example, 10) of the above embodiment, the control unit controls the working machine to collect predetermined data in the first work mode and controls the working machine to perform collection reducing at least some types of data of the predetermined data and further collect the diagnostic data in the second work mode.

According to this embodiment, the processing load in the second work mode can be reduced.

4. In the working machine (for example, 10) of the above embodiment, the control unit controls the working machine to collect predetermined data in the first work mode and controls the working machine to stop a part of functions of the working machine and collect the predetermined data and the diagnostic data in the second work mode.

According to this embodiment, the processing load in the second work mode can be reduced.

5. In the working machine (for example, 10) of the above embodiment, the control unit collects predetermined data at a first frequency in the first work mode, and collects the predetermined data at a second frequency lower than the first frequency and further collects the diagnostic data in the second work mode.

According to this embodiment, the processing load in the second work mode can be reduced.

6. In the working machine (for example, 10) of the above embodiment, the acceptance unit accepts the diagnosis instruction based on a user instruction.

According to this embodiment, it is possible to shift to the second work mode at the timing intended by the user.

7. In the working machine (for example, 10) of the above embodiment, the control unit further determines a possibility of failure of the working machine based on predetermined data collected in work in the first work mode, and the acceptance unit accepts the diagnosis instruction in response to determination that there is a possibility of failure in the working machine.

According to this embodiment, since it is shifted to the second work mode before a failure occurs, it is possible to automatically perform diagnosis.

8. In the working machine (for example, 10) of the above embodiment, the acceptance unit accepts the diagnosis instruction at predetermined time intervals.

According to this embodiment, since it is possible to periodically shift to the second work mode, it is possible to automatically perform diagnosis.

9. In the working machine (for example, 10) of the above embodiment, the control unit causes the working machine to perform work in the second work mode within a range of a preset work schedule.

According to this embodiment, it is possible to prevent collection of the diagnostic data in a time zone outside the work schedule. For example, in a case where the work schedule is a daytime time zone, it is recommended that the collection of the diagnostic data is also performed in the daytime time zone, and, for example, it is possible to prevent the collection of the diagnostic data in the nighttime time zone.

10. In the working machine (for example, 10) of the above embodiment, the control unit controls operation of the working machine based on the diagnostic data after collection of the diagnostic data.

According to this embodiment, it is possible to perform diagnosis by the working machine itself and perform appropriate control based on the diagnosis result.

11. In the working machine (for example, 10) of the above embodiment, the diagnostic data is the number of times of work at each point in a work area, and the control unit controls the operation of the working machine so as to sequentially travel through a plurality of points with a fewer number of times of work.

According to this embodiment, it is possible to preferentially perform work at a point where work remains to be done.

12. In the working machine (for example, 10) of the above embodiment, the diagnostic data is the number of times of work at each point in a work area, and the control unit sets any of a plurality of points with a fewer number of times of work as a start point of work by the working machine.

According to this embodiment, it is possible to complete the work early by performing the work from a point where work tends not to be performed.

13. In the working machine (for example, 10) of the above embodiment, the diagnostic data is the number of collisions of the working machine at each point in a work area, and the control unit controls the operation of the working machine so that a traveling speed of the working machine becomes slower around a point where the number of collisions is equal to or greater than a threshold.

According to this embodiment, it is possible to suppress collision with an obstacle that is difficult to avoid during traveling and to avoid failure.

14. In the working machine (for example, 10) of the above embodiment, the diagnostic data is the number of skidding at each point in a work area, which is the number of skidding of a wheel included in the working machine, and the control unit controls the operation of the working machine so that the traveling speed of the working machine becomes slower around a point where the number of skidding is equal to or greater than a threshold.

According to this embodiment, the occurrence of the skidding can be suppressed by reducing the traveling speed at the point where the skidding is likely to occur. Therefore, the accuracy of estimating self-position can be improved.

15. In the working machine (for example, 10) of the above embodiment, the diagnostic data includes the number of collisions of the working machine at each point in a work area and the number of times of obstacle collision avoidance of the working machine at each point in the work area, and the control unit controls the operation of the working machine based on the number of collisions and the number of times of obstacle collision avoidance.

According to this embodiment, it is possible to perform adaptive control further estimating the situation of the obstacle.

16. The working machine (for example, 10) of the above embodiment, further includes a notification unit (e.g. 155 and 102*b*) configured to issue a notification to the user in a case where the number of collisions is equal to or greater than a threshold and the number of times of obstacle collision avoidance is equal to or smaller than another threshold.

According to this embodiment, in a case where the number of collisions is large and the number of obstacle collisions is small, it is possible to suppress the occurrence of the collision by prompting the user to remove the obstacle or the like.

17. In the working machine (for example, 10) of the above embodiment, the control unit switches from the second work mode to the first work mode in a case where a predetermined amount or more of the diagnostic data is collected or in a case where a predetermined time has elapsed since starting collection of the diagnostic data.

According to this embodiment, it is possible to automatically return to the original work mode at the timing when the collection of the diagnostic data is completed or at the timing when the collection of the diagnostic data will be completed. Therefore, the user can save the trouble of setting the work mode of the working machine to the original mode after the diagnosis is completed.

18. The working machine (for example, 10) of the above embodiment, further includes:

a transmission unit (for example, 155) configured to transmit the diagnostic data collected in the second work mode to a management device (for example, 20); and a reception unit (for example, 156) configured to receive an instruction from the management device that has analyzed the diagnostic data, in which the control unit controls the operation of the working machine based on the instruction received from the management device.

According to this embodiment, the management device performs processing, thereby reducing the processing load on the working machine.

19. A method for controlling a working machine (for example, 10) of the above embodiment is:

a working machine control method including:

causing the working machine to perform work in a first work mode in which work is performed without collecting diagnostic data;

accepting a diagnosis instruction;

switching from the first work mode to a second work mode in which work is performed while collecting the diagnostic data in a case where the diagnosis instruction is accepted; and causing the working machine to perform work in the second work mode in a case where the work mode is switched to the second work mode.

According to this embodiment, it is possible to collect data for diagnosing the working machine while continuing the work. Therefore, it is possible to diagnose the state of the working machine without interrupting the work. In addition, according to this embodiment, since the work mode is switched only when required and the diagnostic data is collected, it is possible to reduce the load at normal times as compared with the case where the diagnostic data is constantly collected.

20. A storage medium according to the above embodiment is:

a non-transitory computer readable storage medium storing a computer program for causing a computer to function as the working machine according to the above embodiment.

According to this embodiment, the working machine according to the present invention can be realized by a computer.

According to the present invention, it is possible to collect data for diagnosing a working machine while continuing work. Therefore, it is possible to diagnose the state of the working machine without interrupting the work.

What is claimed is:

1. A working machine comprising:
a control unit configured to cause the working machine to perform work in a first work mode in which work is performed without collecting diagnostic data;
an acceptance unit configured to accept a diagnosis instruction; and
a switching unit configured to switch from the first work mode to a second work mode in which work is performed while collecting the diagnostic data, in a case where the diagnosis instruction is accepted by the acceptance unit,
wherein the control unit causes the working machine to perform work in the second work mode in a case where the switching unit switches to the second work mode,
wherein the control unit controls the working machine to collect predetermined data in the first work mode, and controls the working machine to perform collection reducing at least some types of data of the predetermined data and further collect the diagnostic data in the second work mode.

2. The working machine according to claim 1, wherein the control unit controls the working machine to collect the predetermined data in the first work mode and further collect the diagnostic data in addition to the predetermined data in the second work mode.

3. The working machine according to claim 1, wherein the control unit controls the working machine to collect the predetermined data in the first work mode, and controls the working machine to stop a part of functions of the working machine and collect the predetermined data and the diagnostic data in the second work mode.

4. The working machine according to claim 1, wherein the control unit collects the predetermined data at a first frequency in the first work mode, and collects the predetermined data at a second frequency lower than the first frequency and further collects the diagnostic data in the second work mode.

5. The working machine according to claim 1, wherein the acceptance unit accepts the diagnosis instruction based on a user instruction.

6. A working machine comprising:
a control unit configured to cause the working machine to perform work in a first work mode in which work is performed without collecting diagnostic data;
an acceptance unit configured to accept a diagnosis instruction; and
a switching unit configured to switch from the first work mode to a second work mode in which work is performed while collecting the diagnostic data, in a case where the diagnosis instruction is accepted by the acceptance unit,
wherein the control unit causes the working machine to perform work in the second work mode in a case where the switching unit switches to the second work mode,
wherein the control unit further determines a possibility of failure of the working machine based on predetermined data collected in work in the first work mode, and
the acceptance unit accepts the diagnosis instruction in response to determination that there is a possibility of failure in the working machine.

7. The working machine according to claim 1, wherein the acceptance unit accepts the diagnosis instruction at predetermined time intervals.

8. The working machine according to claim 1, wherein the control unit causes the working machine to perform work in the second work mode within a range of a preset work schedule.

9. The working machine according to claim 1, wherein the control unit controls operation of the working machine based on the diagnostic data after collection of the diagnostic data.

10. A working machine comprising:
a control unit configured to cause the working machine to perform work in a first work mode in which work is performed without collecting diagnostic data;
an acceptance unit configured to accept a diagnosis instruction; and
a switching unit configured to switch from the first work mode to a second work mode in which work is performed while collecting the diagnostic data, in a case where the diagnosis instruction is accepted by the acceptance unit,
wherein the control unit causes the working machine to perform work in the second work mode in a case where the switching unit switches to the second work mode,
wherein the control unit controls operation of the working machine based on the diagnostic data after collection of the diagnostic data,
the diagnostic data is a number of times of work at each point in a work area, and
the control unit controls the operation of the working machine so as to sequentially travel through a plurality of points with a fewer number of times of work.

11. The working machine according to claim 9, wherein the diagnostic data is a number of times of work at each point in a work area, and
the control unit sets any of a plurality of points with a fewer number of times of work as a start point of work by the working machine.

12. The working machine according to claim 9, wherein the diagnostic data is a number of collisions of the working machine at each point in a work area, and
the control unit controls the operation of the working machine so that a traveling speed of the working machine becomes slower around a point where the number of collisions is equal to or greater than a threshold.

13. The working machine according to claim 9, wherein the diagnostic data is a number of skidding at each point in a work area, which is a number of skidding of a wheel included in the working machine, and
the control unit controls the operation of the working machine so that a traveling speed of the working machine becomes slower around a point where the number of skidding is equal to or greater than a threshold.

14. The working machine according to claim 9, wherein the diagnostic data includes a number of collisions of the working machine at each point in a work area and a number of times of obstacle collision avoidance of the working machine at each point in the work area, and
the control unit controls the operation of the working machine based on the number of collisions and the number of times of obstacle collision avoidance.

15. The working machine according to claim 14, further comprising a notification unit configured to issue a notification to a user in a case where the number of collisions is equal to or greater than a threshold and the number of times of obstacle collision avoidance is equal to or smaller than another threshold.

16. The working machine according to claim 9, wherein the control unit switches from the second work mode to the first work mode when a predetermined amount or more of the diagnostic data is collected or when a predetermined time has elapsed since starting collection of the diagnostic data.

17. The working machine according to claim 9, further comprising:
a transmission unit configured to transmit the diagnostic data collected in the second work mode to a management device; and
a reception unit configured to receive an instruction from the management device that has analyzed the diagnostic data,
the control unit controls the operation of the working machine based on the instruction received from the management device.

18. A working machine control method comprising:
causing the working machine to perform work in a first work mode in which work is performed without collecting diagnostic data;
accepting a diagnosis instruction;
switching from the first work mode to a second work mode in which work is performed while collecting the diagnostic data when the diagnosis instruction is accepted; and
causing the working machine to perform work in the second work mode when the work mode is switched to the second work mode,
wherein the working machine is controlled to collect predetermined data in the first work mode, and the working machine is controlled to perform collection reducing at least some types of data of the predetermined data and further collect the diagnostic data in the second work mode.

* * * * *